United States Patent
Kashyap et al.

(10) Patent No.: US 9,633,100 B2
(45) Date of Patent: Apr. 25, 2017

(54) SYSTEM AND METHOD FOR DATA STRUCTURE SYNCHRONIZATION

(71) Applicant: DELL PRODUCTS L.P., Round Rock, TX (US)

(72) Inventors: Prakash Kashyap, Cupertino, CA (US); Padmavathi V. Uppalapatti, San Jose, CA (US)

(73) Assignee: DELL PRODUCTS, L.P., Round Rock, TX (US)

( * ) Notice: Subject to any disclaimer, the term of this patent is extended or adjusted under 35 U.S.C. 154(b) by 573 days.

(21) Appl. No.: 14/156,263

(22) Filed: Jan. 15, 2014

(65) Prior Publication Data
US 2015/0199416 A1    Jul. 16, 2015

(51) Int. Cl.
*G06F 17/30* (2006.01)
*H04L 12/891* (2013.01)
*H04L 12/801* (2013.01)
*H04L 12/755* (2013.01)

(52) U.S. Cl.
CPC .. *G06F 17/30581* (2013.01); *G06F 17/30174* (2013.01); *G06F 17/30575* (2013.01); *H04L 47/193* (2013.01); *H04L 47/41* (2013.01); *H04L 45/021* (2013.01)

(58) Field of Classification Search
CPC ......... G06F 17/30174; G06F 17/30575; G06F 17/30581
USPC ....................................................... 707/622
See application file for complete search history.

(56) References Cited

U.S. PATENT DOCUMENTS

| 5,884,328 | A | * | 3/1999 | Mosher, Jr. | ......... G06F 11/1662 |
| 5,916,307 | A | * | 6/1999 | Piskiel | ................. G06F 9/546 |
| | | | | | 718/101 |
| 6,324,693 | B1 | * | 11/2001 | Brodersen | ................. G06F 8/65 |
| | | | | | 707/999.202 |
| 6,397,125 | B1 | * | 5/2002 | Goldring | .......... G06F 17/30581 |
| | | | | | 700/200 |

(Continued)

OTHER PUBLICATIONS

Eppstein et al., "What's the Difference? Efficient Set Reconciliation without Prior Context," Proceedings of the ACM SIGCOMM 2011 conference, pp. 218-229, 12 pages total, http://www.ics.uci.edu/~eppstein/pubs/EppGooUye-SIGCOMM-11.pdf.

(Continued)

*Primary Examiner* — Mark E Hershley
(74) *Attorney, Agent, or Firm* — Haynes & Boone, LLP (57) ABSTRACT

A system and method for data structure synchronization includes a control unit and a memory coupled to the control unit. The memory stores a first base data structure and a first digest data structure. The control unit maintains the first digest data structure based on the first base data structure and determines whether the first base data structure is in synchronization with a second base data structure. When the first and second base data structures are not in synchronization, the control unit receives a second digest data structure based on the second base data structure, attempts to synchronize the first base data structure to the second base data structure based on differences between the first and second digest data structures, and receives the second base data structure from the second computing device and replaces the first base data structure with the second base data structure when the attempt is not successful.

20 Claims, 6 Drawing Sheets

(56) References Cited

U.S. PATENT DOCUMENTS

| | | | | |
|---|---|---|---|---|
| 9,158,847 | B1* | 10/2015 | Majumdar | G06F 17/30312 |
| 2002/0059279 | A1* | 5/2002 | Kim | G06F 11/2074 |
| 2004/0001485 | A1* | 1/2004 | Frick | H04L 41/0663 |
| | | | | 370/389 |
| 2004/0044702 | A1* | 3/2004 | Ferreira Alves | G06F 17/30575 |
| 2004/0123048 | A1* | 6/2004 | Mullins | G06F 12/0815 |
| | | | | 711/141 |
| 2006/0020594 | A1* | 1/2006 | Garg | G06F 17/30575 |
| 2007/0112880 | A1* | 5/2007 | Yang | G06F 17/30581 |
| 2009/0157537 | A1* | 6/2009 | Miller | G06Q 10/109 |
| | | | | 705/32 |
| 2009/0307251 | A1* | 12/2009 | Heller | G06F 17/3015 |
| 2011/0213775 | A1* | 9/2011 | Franke | G06F 17/30584 |
| | | | | 707/737 |
| 2011/0213984 | A1* | 9/2011 | Orlando | H04L 9/3239 |
| | | | | 713/181 |
| 2011/0258225 | A1* | 10/2011 | Taylor | G06F 17/30336 |
| | | | | 707/769 |
| 2011/0269424 | A1* | 11/2011 | Multer | H04L 67/1095 |
| | | | | 455/411 |
| 2013/0070761 | A1* | 3/2013 | Kamble | H04L 49/253 |
| | | | | 370/389 |
| 2013/0339643 | A1* | 12/2013 | Tekade | G06F 17/30581 |
| | | | | 711/162 |
| 2014/0279941 | A1* | 9/2014 | Atkisson | G06F 17/30371 |
| | | | | 707/690 |

OTHER PUBLICATIONS

James, Mike, "The Bloom Filter," dated May 9, 2011 (content last updated Aug. 15, 2012), 6 pages total, http://www.i-programmer.info/programming/theory/2404-the-bloom-filter.html?start=1.

* cited by examiner

SYSTEM AND METHOD FOR DATA STRUCTURE SYNCHRONIZATION

BACKGROUND

The present disclosure relates generally to information handling systems, and more particularly to data structure synchronization.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often required to continuously make forwarding decisions and to update forwarding information as network configurations change. To provide redundancy and/or fail over support in the network, two or more network switching products in a network may provide backup or similar services for each other. In some examples, two network switching products may be configured as a high-availability pair where one network switching product may be configured to take over the responsibilities of a second network switching product when the second network switching product is unavailable due to maintenance and/or failure. In some examples, one network switching product may maintain duplicate copies of one or more data structures stored by a second network switching product. In order for the first network switching product to provide take over and/or backup support, the second network switching product, it may be useful for the first network switching product to maintain synchronized copies of one or more data structures being created and/or managed in the second network switching product. In many cases these data structures may be quite large in size, storing thousands or even tens of thousands or more entries. Due to the size of these data structures, it may not be practical to have the second network switching product forward a copy of the data structure to the first network switching product whenever synchronization between the data structures is desired.

Accordingly, it would be desirable to provide improved methods and systems for synchronizing data structures between two devices, such as two network switching products.

SUMMARY

According to one embodiment, a computing device includes a control unit and a memory coupled to the control unit. The memory stores a first base data structure and a first digest data structure. The control unit is configured to maintain the first digest data structure based on entries stored in the first base data structure and determine whether the first base data structure is in synchronization with a second base data structure stored in a second computing device. When the first base data structure is not in synchronization with the second base data structure, the control unit is further configured to receive a second digest data structure based on the second base data structure from the second computing device, attempt to synchronize the first base data structure to the second base data structure based on differences between the first and second digest data structures, and receive the second base data structure from the second computing device and replace the first base data structure with the second base data structure when the attempt is not successful.

According to another embodiment, a method of synchronizing base data structures includes maintaining a first digest data structure based on entries stored in a first base data structure, determining whether the first base data structure is in synchronization with a second base data structure stored in a second computing device. When the first base data structure is not in synchronization with the second base data structure, the method further includes receiving a second digest data structure based on the second base data structure from the second computing device, attempting to synchronize the first base data structure to the second base data structure based on differences between the first and second digest data structures, and receiving the second base data structure from the second computing device and replacing the first base data structure with the second base data structure when the attempt is not successful. The first base data structure is stored in a first computing device.

According to yet another embodiment, a computing device includes a control unit and a memory coupled to the control unit. The memory stores a first base data structure and a first digest data structure. The control unit is configured to maintain the first digest data structure based on entries stored in the first base data structure and determine whether the first base data structure is in synchronization with a second base data structure stored in a second computing device. When the first base data structure is not in synchronization with the second base data structure, the control unit is further configured to receive a second digest data structure based on the second base data structure from the second computing device, determine a difference digest data structure based on differences between the first digest data structure and the second digest data structure, identify one or more pure buckets in the difference digest data structure, transmit an entry add or an entry remove request for the second base data structure to the second computing device for each of the one or more pure buckets, and transmit the first base data structure to the second computing device when the difference data structure cannot be used to bring the second base data structure into synchronization with the first base data structure.

According to yet another embodiment, an information handling system includes a network switching device. The network switching device includes a control unit and a memory coupled to the control unit. The memory stores a first base data structure and a first digest data structure. The control unit is configured to maintain the first digest data structure based on entries stored in the first base data structure and determine whether the first base data structure is in synchronization with a second base data structure stored in a second network switching device. When the first base data structure is not in synchronization with the second base data structure, the control unit is further configured to receive a second digest data structure based on the second base data structure from the second network switching device, determine a difference digest data structure based on differences between the first digest data structure and the second digest data structure, identify one or more pure buckets in the difference digest data structure, add or remove an entry from the difference digest data structure and add or remove an entry from the first base data structure for each of the one or more pure buckets, and receive the second base data structure from the second network switching device and replace the first base data structure with the second base data structure when the difference digest data structure cannot be used to synchronize the first base data structure to the second base data structure. The network switching device is elected from a group consisting of a router, a switch, a hub, and a bridge.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
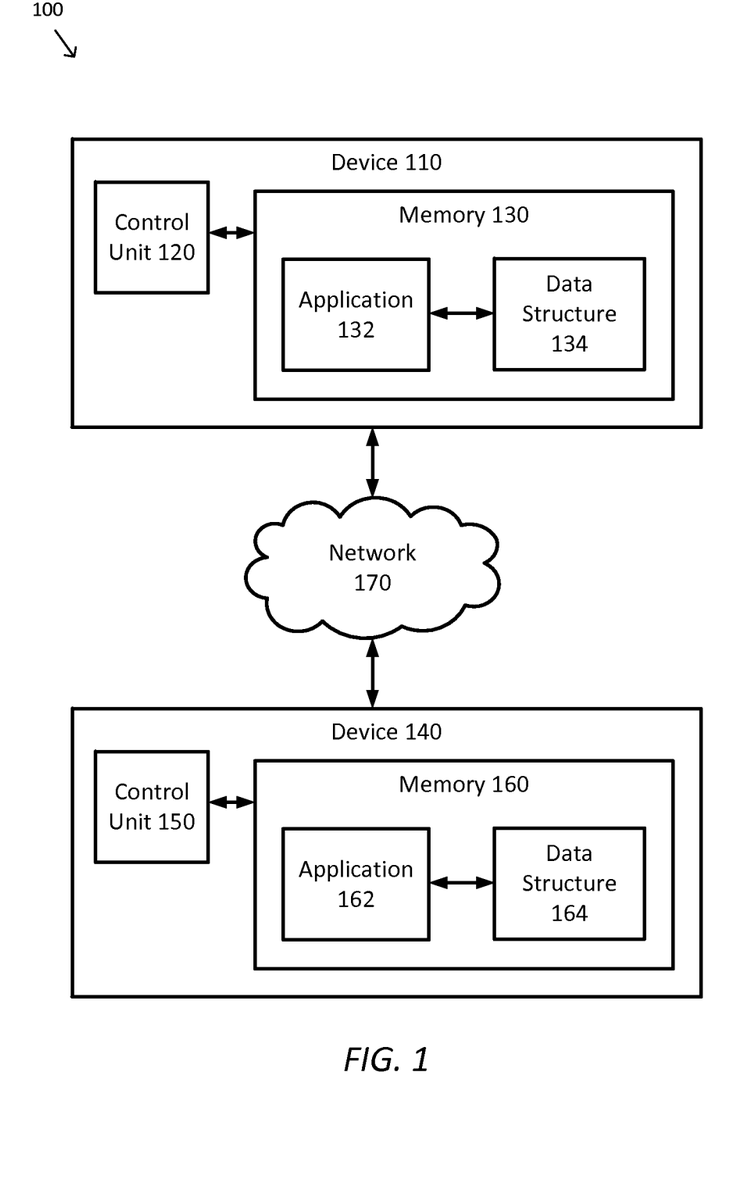
FIG. 1 is a simplified diagram of a distributed computing system according to some embodiments.

FIG. 1 is a simplified diagram of a distributed computing system 100 according to some embodiments. As shown in FIG. 1, system 100 includes two computing devices 110 and 140. And, although only two computing devices 110 and 140 are shown in FIG. 1, one of ordinary skill would understand that system 100 may include any number of computing devices of various types and/or capabilities. In some embodiments, computing devices 110 and/or 140 may be any type of computing device including personal computers, servers, laptops, desk tops, tablets, mobile devices, network switching devices, and/or the like. In some examples, the network switching devices may include switches, routers, hubs, bridges, and/or the like.

As shown, computing device 110 includes a control unit 120 coupled to memory 130 and computing device 140 includes a control unit 150 coupled to memory 160. Each of control units 120 and/or 150 may control the operation of its respective computing device 110 and/or 140. In some examples, control units 120 and/or 150 may each include one or more processors, central processing units, virtual machines, microprocessors, microcontrollers, application specific integrated circuits (ASICs), field programmable gate arrays (FPGAs), and/or the like.

Memory 130 may be used to store one or more applications and one or more data structures, such as a representative application 132 and data structure 134. Similarly, memory 160 may be used to store one or more applications and one or more data structures, such as a representative application 162 and data structure 164. Memories 130 and/or 160 may each include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

The data structures 134 and/or 164 may vary in size, usage, and/or complexity depending upon the purposes of computing devices 110 and/or 140 and/or applications 132 and/or 162. In some embodiments, when computing devices 110 and/or 140 are network switching devices, such as switches, routers, hubs, bridges, and/or the like, the data structures 134 and/or 164 may include one or more tables with forwarding and/or similar information. In some examples, these tables may include one or more virtual LAN tables, link aggregation group (LAG) tables, layer 2 (L2) next hop tables, layer 3 (L3) routing tables, L3 forwarding information bases (FIBs), flow tables, and/or the like. Depending upon the networking environment of system 100 and/or the role of computing devices 110 and/or 140, these tables may include anywhere from a few dozen entries to thousands, or even tens of thousands or more entries.

Computing devices 110 and 140 are also coupled together using a network 170. Network 170 may be any kind of network including a cable, a local area network (LAN) such as an Ethernet, and/or a wide area network (WAN) such as an internet. Computing devices 110 and 140 through their applications, such as applications 132 and/or 162, may use network 170 to exchange information and/or to provide services for each other. In some examples, computing device 140 may be used to provide backup and/or fail over services for computing device 110. In some examples, computing device 140 may be maintaining data structure 164 as a synchronized copy of data structure 134.

There are several ways in which computing device 140 may maintain data structure 164 as a synchronized copy of data structure 134. In some embodiments, computing device 110 may periodically transmit a copy of data structure 134 to computing device 140, with the transmitted copy becoming data structure 164. For small and/or even moderately sized data structures, this may be a reasonable practice, but as data structure 134 increases in size, the time and/or bandwidth used to transmit a complete copy of data structure 134 to computing device 140 may become unreasonable.

In some embodiments, computing device 110 may forward any incremental changes to data structure 134 to computing device 140 so the incremental changes may be applied to data structure 164. In some examples, this may include transmitting the equivalent of any operation that adds, removes, and/or updates any entry in data structure 134 to computing device 140, so that the respective operations may also be applied to data structure 164. In some examples, the incremental changes may be transmitted as differences and/or diffs between data structure 134 and data structure 164. However, in order for incremental changes to work, data structures 134 and 164 should remain in synchronization with data structure 164 maintaining an accurate copy of data structure 134. As soon as data structure 164 loses synchronization with data structure 134, the incremental changes may further compound any differences between data structures 134 and 164 and are generally unable to reconcile data structures 134 and 164 back into synchronization. In some examples, loss of synchronization may occur when incremental changes for data structure 134 are lost, damaged, and/or processed out of order on data structure 164.

One possible solution to the loss of synchronization between data structures 134 and 164 is to periodically check for synchronization between data structures 134 and 164, and when synchronization is lost, retransmit a complete copy of data structure 134 to computing device 140 to replace the unsynchronized data structure 164. In some examples, loss of synchronization between data structures 134 and 164 may be detected by exchanging checksums, hashes, and/or the like between computing devices 110 and 140. This solution, however, operates in an error detection mode where, when an error (loss of synchronization) is detected, recovery of synchronization is returned by transmitting a complete copy of the data structure 134.

A better solution would involve at least some level of error correction, so that when loss of synchronization is detected, it may be possible to reconcile or recover synchronization when the differences between data structure 134 and 164 are not too large. In some examples, error correction and/or reconciliation may involve more sophisticated mechanisms than checksums, hashes, and/or the like. In some examples, computing devices 110 and 140 may be able to provide some level of reconciliation by exchanging additional data structures that are smaller than data structures 134 and 164, yet provide the ability for data structure 164 to be brought back into synchronization with data structure 134 without having to transmit a complete copy of data structure 134 to computing device 140. One such possible data structure for providing a partial solution to this problem is the invertible bloom filter (IBF).

Figure 2:
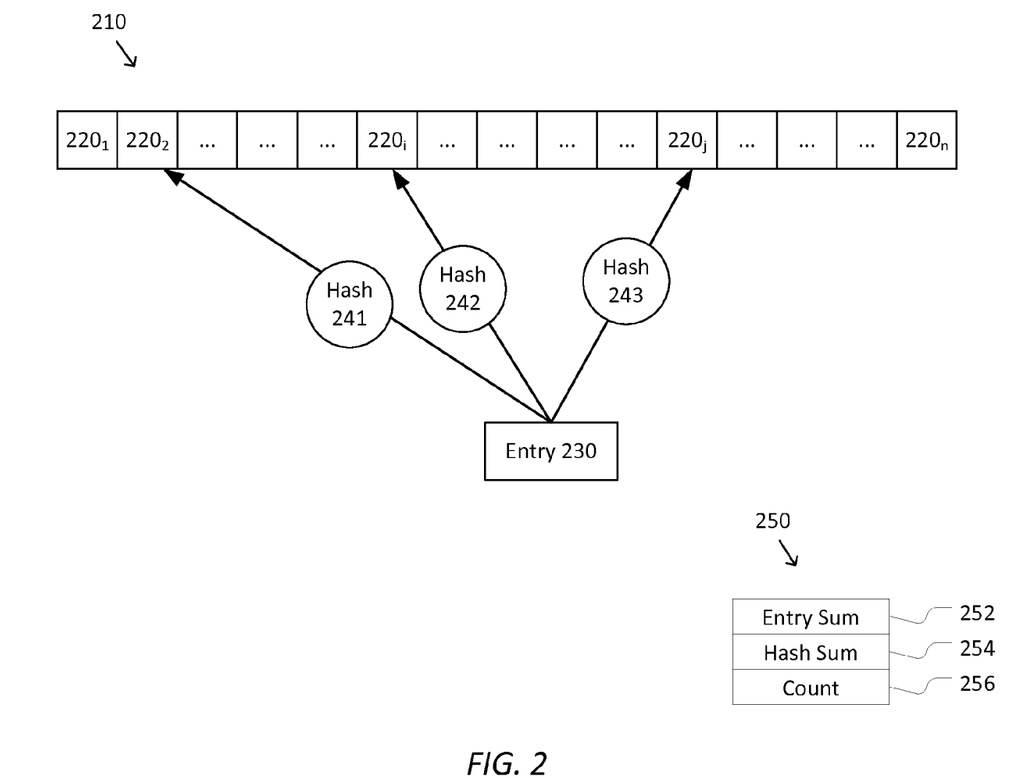
FIG. 2 is a simplified diagram of an invertible bloom filter according to some embodiments.

FIG. 2 is a simplified diagram of an invertible bloom filter according to some embodiments. An IBF uses multiple hash functions to encode entries from a base data structure, such as one of the tables of data structures 134 and/164, into multiple buckets of the IBF. As shown in FIG. 2, an IBF 210 includes a plurality of buckets $220_1$ through $220_n$. Each entry 230 of the base data structure is hashed by a plurality of hash functions so that it is assigned or added to a corresponding plurality of the buckets $220_1$ through $220_n$. For example, when three hash functions are used with an IBF, each entry from the base data structure is added to three buckets. As shown in FIG. 2, each of the hash functions 241-243 may be used to identify a corresponding bucket $220_1$ through $220_n$ in IBF 210. As shown, when hash 241 is applied to entry 230 it identifies bucket $220_2$ and entry 230 is added to bucket $220_2$. In some examples, hash 241 may be applied to entry 230 resulting in a hash value, so that modulo n of that hash value results in a value of 2. Similarly, when hash 242 is applied to entry 230, bucket $220_i$ is identified and when hash 243 is applied to entry 230, bucket $220_j$ is identified. And although FIG. 2 depicts IBF 210 with n buckets and three hash functions, any number of buckets and/or hash functions may be used in practice to balance the size and/or cost of computing the IBF with the ability of the IBF to support reconciliation and/or other capabilities.

Each of the buckets $220_1$ through $220_n$ includes three elements as shown by a representative bucket 250. The three elements include an entry sum 252, a hash sum 254, and a count 256. When an entry is added or assigned to bucket 250, each of the elements 252-256 is updated accordingly. Entry sum 252 includes the sum of the entries added or assigned to bucket 250. Entry sum 252 is computed using exclusive or (XOR) arithmetic so that when an entry is "added" twice to entry sum 252, the second addition cancels the first. This is useful for supporting removal of an entry from bucket 250. Hash sum 254 includes the sum, again using XOR arithmetic, of a hash of each of the entries added or assigned to bucket 250. Count 256 includes a count of the number of entries in bucket 250.

Several operations may be performed on IBF 210 and buckets $220_1$ through $220_n$ that may be used to support synchronization and reconciliation of two data structures. These operations including adding entries to an IBF, removing entries from an IBF, determining the differences between two IBFs, and using two IBFs to partially reconcile two base data structures used to compute the two IBFs. These operations are respectively shown in FIGS. 3-6.

Figure 3:
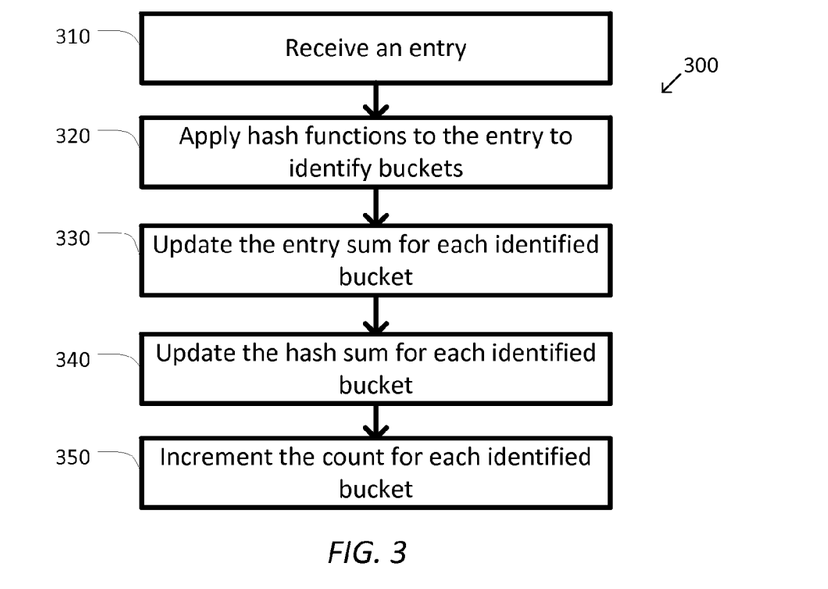
FIG. 3 is a simplified diagram of a method of adding an entry to an invertible bloom filter according to some embodiments.

FIG. 3 is a simplified diagram of a method 300 of adding an entry to an invertible bloom filter according to some embodiments. In some embodiments, one or more of the processes 310-350 of method 300 may be implemented, at least in part, in the form of executable code stored on non-transient, tangible, machine readable media that when run by one or more processors (e.g., the one or more processors of control units 120 and/or 150) may cause the one or more processors to perform one or more of the processes 310-350. In some embodiments, method 300 may be performed in a computing device, such as computing device 110 and/or 140.

At a process 310, an entry is received. The entry may be received for addition to an IBF using any suitable mechanism. In some examples, the entry may be received as a parameter in an application programming interface (API) call that also identifies the IBF. In some examples, when the IBF is implemented as an object in an object-oriented language such as C++ or Java, the entry may be received as a parameter of a member function.

At a process 320, hash functions are applied to the entry to identify buckets. Each of the hash functions for the IBF, such as hash functions 241-243 are applied to the entry received during process 310. Each hash function identifies a corresponding bucket of the IBF filter into which the entry is to be added. In some examples, each hash function may determine a hash value based on the entry, which when taken modulo relative to the number of buckets of the IBF may identify the bucket number associated with the respective hash function.

At a process 330, the entry sum for each identified bucket is updated. For each of the buckets of the IBF identified in process 320, the corresponding entry sum, such as entry sum 252, is updated based on the value of the entry. In some examples, the entry sum may be updated by adding the entry to the entry sum of the corresponding bucket using XOR arithmetic.

At a process 340, the hash sum for each identified bucket is updated. For each of the buckets of the IBF identified in process 320, the corresponding hash sum, such as hash sum 254, is updated based on a hashed value of the entry. In some examples, the hash function used to hash the entry may be different than the hash functions used during process 320 to identify the buckets. In some examples, the hash sum may be updated by adding the hashed entry value to the hash sum of the corresponding bucket using XOR arithmetic.

At a process 350, the count for each identified bucket is incremented. For each of the buckets of the IBF identified in process 320, the corresponding count, such as count 256, is incremented. The corresponding count allows the IBF to keep track of how many entries have been added to the corresponding bucket.

Figure 4:
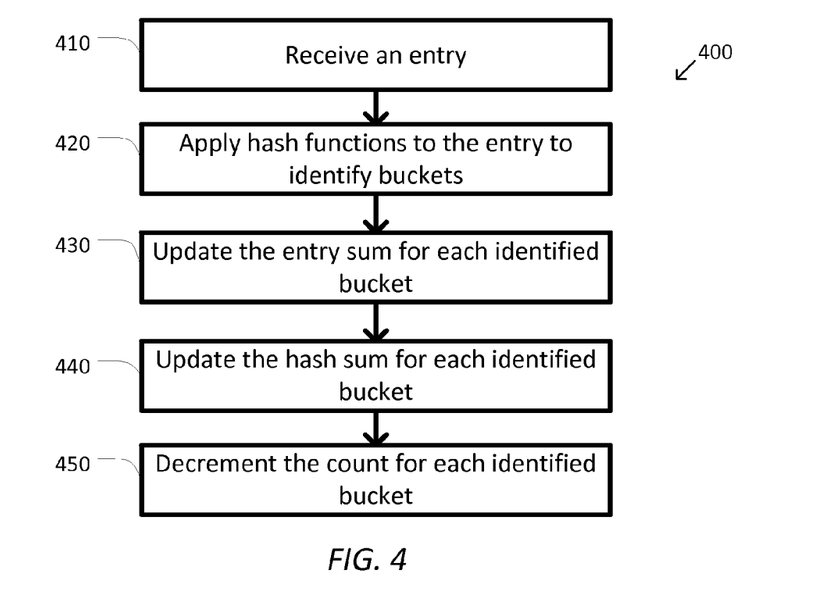
FIG. 4 is a simplified diagram of a method of removing an entry from an invertible bloom filter according to some embodiments.

FIG. 4 is a simplified diagram of a method 400 of removing an entry from an invertible bloom filter according to some embodiments. In some embodiments, one or more of the processes 410-450 of method 400 may be implemented, at least in part, in the form of executable code stored on non-transient, tangible, machine readable media that when run by one or more processors (e.g., the one or more processors of control units 120 and/or 150) may cause the one or more processors to perform one or more of the processes 410-450. In some embodiments, method 400 may be performed in a computing device, such as computing device 110 and/or 140.

At a process 410, an entry is received. The entry may be received for removal from an IBF using any suitable mechanism. In some examples, the entry may be received as a parameter in an API and/or a member function call.

At a process 420, hash functions are applied to the entry to identify buckets. Each of the hash functions for the IBF, such as hash functions 241-243 are applied to the entry received during process 410. Each hash function identifies a corresponding bucket of the IBF filter from which the entry is to be removed. In some examples, each hash function may determine a hash value based on the entry, which when taken modulo relative to the number of buckets of the IBF may identify the bucket number associated with the respective hash function.

At a process 430, the entry sum for each identified bucket is updated. For each of the buckets of the IBF identified in process 420, the corresponding entry sum, such as entry sum 252, is updated based on the value of the entry. In some examples, the entry sum may be updated by adding the entry to the entry sum of the corresponding bucket using XOR arithmetic. In some examples, by using XOR arithmetic the addition of the value of the entry to the corresponding entry sum cancels a previous addition of the same entry to the corresponding entry sum.

At a process 440, the hash sum for each identified bucket is updated. For each of the buckets of the IBF identified in process 420, the corresponding hash sum, such as hash sum 254, is updated based on a hashed value of the entry. In some examples, the hash function used to hash the entry may be different than the hash functions used during process 420 to identify the buckets. In some examples, the hash sum may be updated by adding the hashed entry value to the hash sum of the corresponding bucket using XOR arithmetic. In some examples, by using XOR arithmetic the addition of the hashed entry value of the entry to the corresponding hash sum cancels a previous addition of the same hashed value of the entry to the corresponding hash sum.

At a process 450, the count for each identified bucket is decremented. For each of the buckets of the IBF identified in process 420, the corresponding count, such as count 256, is decremented. Decrementing the count reduces by one the number of entries assigned to the corresponding bucket.

Figure 5:
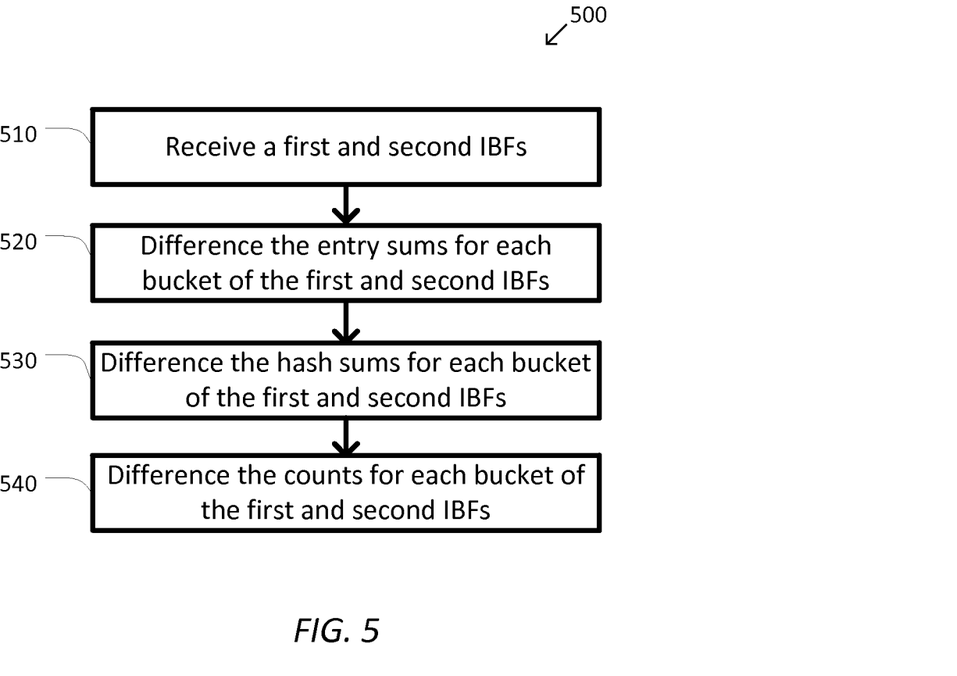
FIG. 5 is a simplified diagram of a method of determining a difference between two invertible bloom filters according to some embodiments.

FIG. 5 is a simplified diagram of a method 500 of determining a difference between two invertible bloom filters according to some embodiments. In some embodiments, one or more of the processes 510-540 of method 500 may be implemented, at least in part, in the form of executable code stored on non-transient, tangible, machine readable media that when run by one or more processors (e.g., the one or more processors of control units 120 and/or 150) may cause the one or more processors to perform one or more of the processes 510-540. In some embodiments, method 500 may be performed in a computing device, such as computing device 110 and/or 140. In some embodiments, method 500 may be applied to two IBFs to determine a third IBF that is the difference of the two IBFs.

At a process 510, a first and a second IBF are received. The first and second IBFs may be received by any suitable mechanism. In some examples, the IBFs may be received as parameters in an API and/or a member function call, as operands to an overloaded subtraction operator, and/or the like. In some examples, the second IBF may be subtracted from the first IBF to determine a third IBF that is the difference between the first and second IBFs.

At a process 520, the difference between entry sums for each corresponding bucket in the first and second IBFs is determined. For each of the corresponding buckets of the first and second IBFs received during process 510, the difference of the corresponding entry sums, such as entry sum 252, from the corresponding buckets is determined. Thus for IBFs with n buckets, the differences between n corresponding pairs of entry sums is determined. In some examples, the corresponding entry sums may be differenced by adding the corresponding entry sums together using XOR arithmetic. In some examples, by using XOR arithmetic the addition of the corresponding entry sums acts as the equivalent of a subtraction operation.

At a process 530, the difference between hash sums for each corresponding bucket in the first and second IBFs is determined. For each of the corresponding buckets of the first and second IBFs received during process 510, the difference of the corresponding hash sums, such as hash sum 254, from the corresponding buckets is determined. Thus for IBFs with n buckets, the differences between n corresponding pairs of hash sums is determined. In some examples, the corresponding hash sums may be differenced by adding the corresponding hash sums together using XOR arithmetic. In some examples, by using XOR arithmetic the addition of the corresponding hash sums acts as the equivalent of a subtraction operation.

At a process 550, the difference between counts for each corresponding bucket in the first and second IBFs is determined. For each of the corresponding buckets of the first and second IBFs received during process 510, the difference of the corresponding counts, such as count 256, from the corresponding buckets is determined. Thus for IBFs with n buckets, the differences between n corresponding pairs of counts is determined. In some examples, the corresponding counts may be differenced using subtraction.

As a result of performing the differencing operations of method 500, the third or difference IBF contains a record of each of the buckets that are different between the first and second IBFs. For each of these buckets, the entry sum includes a sum of any differences in the sum of the entry values added to the corresponding bucket in the first and second IBFs. Similarly, for each of these buckets, the hash sum includes a sum of any differences in the sum of the hashes of the entry values added to the corresponding bucket in the first and second IBFs. If the entries added to the corresponding buckets in the first and second IBFs are the same, the entry sum and the hash sum of the difference will be zero. Additionally, for each of these buckets, the count includes a difference of the number of entries added to the corresponding buckets in the first and second IBFs. A count value greater than zero indicates that more entries were added to the corresponding bucket in the first IBF than in the second. A count value less than zero indicates that more entries were added to the corresponding bucket in the second IBF than in the first. When each of the buckets in the difference IBF includes an entry sum, a hash sum, and a count that are zero, the first and second IBFs are the same. In some examples, this may also indicate that the base data structures corresponding to the first IBF and the second IBF contain the same entries such that the base data structures are in synchronization.

Figure 6:
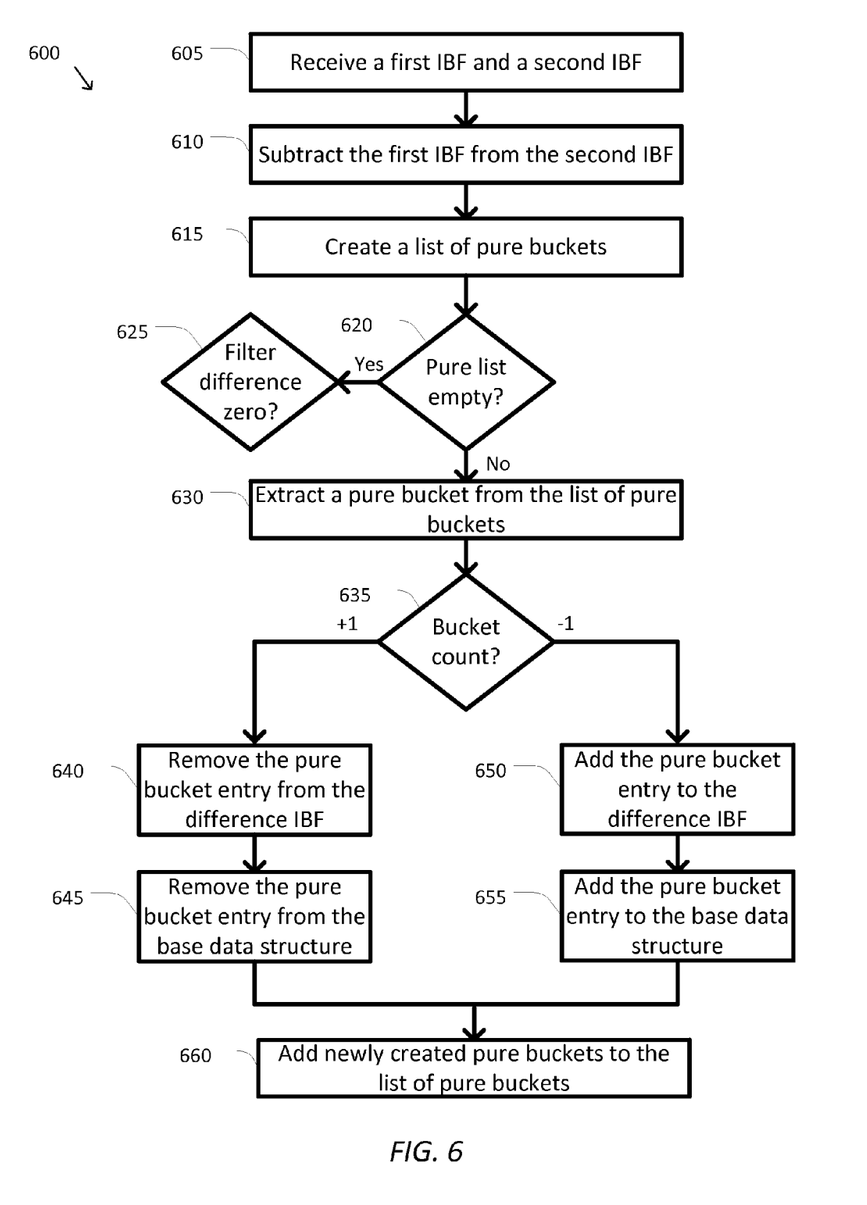
FIG. 6 is a simplified diagram of a method of reconciling two base data structures using invertible bloom filters according to some embodiments.

FIG. 6 is a simplified diagram of a method 600 of reconciling two base data structures using invertible bloom filters according to some embodiments. In some embodiments, one or more of the processes 605-660 of method 600 may be implemented, at least in part, in the form of executable code stored on non-transient, tangible, machine readable media that when run by one or more processors (e.g., the one or more processors of control units 120 and/or 150) may cause the one or more processors to perform one or more of the processes 605-660. In some embodiments, method 600 may be performed in a computing device, such as computing device 110 and/or 140. In some embodiments, method 600 may be used to correct or reconcile one base data structure corresponding to one IBF to a second base data structure by using the IBF of the second data structure without having to access the second base data structure.

At a process 605, a first and a second IBF are received. The first and second IBFs may be received by any suitable mechanism. In some examples, the IBFs may be received as parameters in an API and/or a member function call, as operands to an overloaded subtraction operator, and/or the like. In some examples, the first IBF may be received at a first computing device and may be used to reconcile a base data structure corresponding to the second IBF to the base data structure corresponding to the first IBF.

At a process 610, the first IBF is subtracted from the second IBF. Using a process similar to method 500, the first IBF is subtracted from the second IBF to create a difference IBF. The difference IBF may be used to determine whether the first and second IBFs are the same and may further provide hints as to how to reconcile the base data structures corresponding to the first and second IBFs.

At a process 615, a list of pure buckets is created. Each of the buckets in the difference IBF is examined to determine whether it is a pure bucket. A pure bucket is a bucket that may be used to identify an individual entry that was added to either the first of second IBF. When used in the context of reconciling the base data structure corresponding to the second IBF to the base data structure corresponding to the first IBF, this may include the case where the entry was added to the first IBF and not added to the second IBF or the case where the entry was removed from the first IBF and not removed from the second IBF. In some examples, a pure bucket may be identified based on the entry sum, hash sum, and count elements of the pure bucket. A count value of positive or negative one indicates that the first and second IBFs differ by one as to the number of entries added to the corresponding bucket. This may occur due to an actual difference in one entry or as a result of multiple differences, such as two adding operations and one removing operation on one of the IBFs not reflected in the other. To confirm whether the difference is due to a single entry, the hash function used for creating the hash values used in the hash sum is applied to the entry sum of the corresponding bucket and the result is compared to the hash sum in the corresponding bucket. When the two values are the same, the corresponding bucket is a pure bucket that is added to the list of pure buckets.

At a process 620, it is determined whether the list of pure buckets is empty. When the list of pure buckets is empty, the difference IBF no longer contains any usable hints for reconciling the first and second IBFs and the corresponding base data structures. When the list of pure buckets is empty, it is determined whether the first and second IBFs are reconciled using a process 625. When the list of pure buckets is not empty, the reconciliation of the first and second IBFs continues beginning with a process 630.

At the process 625, it is determined whether the difference IBF is zero. Each of the buckets in the difference IBF is examined to determine whether each of the corresponding entry sum, hash sum, and count elements is zero. When each of these is zero, the first and second IBFs are reconciled and the corresponding base data structures are synchronized.

More specifically, the base data structure corresponding to the second IBF is now updated to contain the same entries as the base data structure corresponding to the first IBF. When any of the buckets of the difference IBF includes an element that is not zero, the first and second IBFs are not reconciled and the corresponding base data structures are not synchronized. After completion to the determination of process 625, method 600 finishes.

At the process 630, a pure bucket is extracted from the list of pure buckets. Each of the pure buckets in the list of pure buckets is processed in turn to either add or remove an entry from the second IBF and the base data structure corresponding to the second IBF. Once the pure bucket is extracted from the list of pure buckets, it is removed from the list of pure buckets.

At a process 635, it is determined whether the count element of the extracted pure bucket is positive or negative one. When the count element is positive one, the second IBF includes an entry not found in the first IBF and the entry is removed from the difference IBF and the base data structure corresponding to the second IBF beginning with a process 640. When the count element is negative one, the first IBF includes an entry not found in the second IBF and the entry is added to the difference IBF and the base data structure corresponding to the second IBF beginning with a process 650.

At the process 640, the pure bucket entry is removed from the difference IBF. When the count element of the extracted pure bucket is positive one, the second IBF and its corresponding base data structure include an entry that is to be removed. The entry to remove is identified by the entry sum element of the extracted pure bucket. In some examples, the entry may be removed from the difference IBF using a process similar to method 400.

At a process 645, the pure bucket entry is removed from the base data structure. To bring the base data structure corresponding to the second IBF closer to synchronization with the base data structure corresponding to the first IBF, the entry from the extracted pure bucket as identified during process 640 is removed from the base data structure corresponding to the second IBF. In some examples, the APIs and/or other mechanisms used by the base data structure may be used to remove the entry from the base data structure corresponding to the second IBF. The difference IBF is then checked for newly created pure buckets using a process 660.

At the process 650, the pure bucket entry is added to the difference IBF. When the count element of the extracted pure bucket is negative one, the second IBF and its corresponding base data structure are missing an entry that is to be added. The entry to add is identified by the entry sum element of the extracted pure bucket. In some examples, the entry may be added to the difference IBF using a process similar to method 300.

At the process 655, the pure bucket entry is added to the base data structure. To bring the base data structure corresponding to the second IBF closer to synchronization with the base data structure corresponding to the first IBF, the entry from the extracted pure bucket as identified during process 640 is added to the base data structure corresponding to the second IBF. In some examples, the APIs and/or other mechanisms used by the base data structure may be used to add the entry to the base data structure corresponding to the second IBF. The difference IBF is then checked for newly created pure buckets using a process 660.

At the process 660, newly created pure buckets are added to the list of pure buckets. Whenever an entry is added to or removed from the difference IBF, this may create additional pure buckets that may be used to reconcile the first and second IBFs and bring the base data structure corresponding to the second IBF closer to synchronization with the base data structure corresponding to the first IBF. Similar to process 615, any buckets in the difference IBF with a count element of positive or negative one and an entry sum element whose hashed value is equal to the hash sum element are pure buckets and may be added to the list of pure buckets. In some examples, each of the buckets altered by the remove or add operations of processes 640 and/or 660 are checked during process 660 to determine whether they have become pure buckets. The list of pure buckets in then checked to determine whether it is empty using process 620.

As discussed above and further emphasized here, FIGS. 3-6 are merely example which should not unduly limit the scope of the claims. One of ordinary skill in the art would recognize many variations, alternatives, and modifications. In some embodiments, digest data structures other than the invertible bloom filter may be used with the adding, removing, differencing, and reconciling methods.

Figure 7:
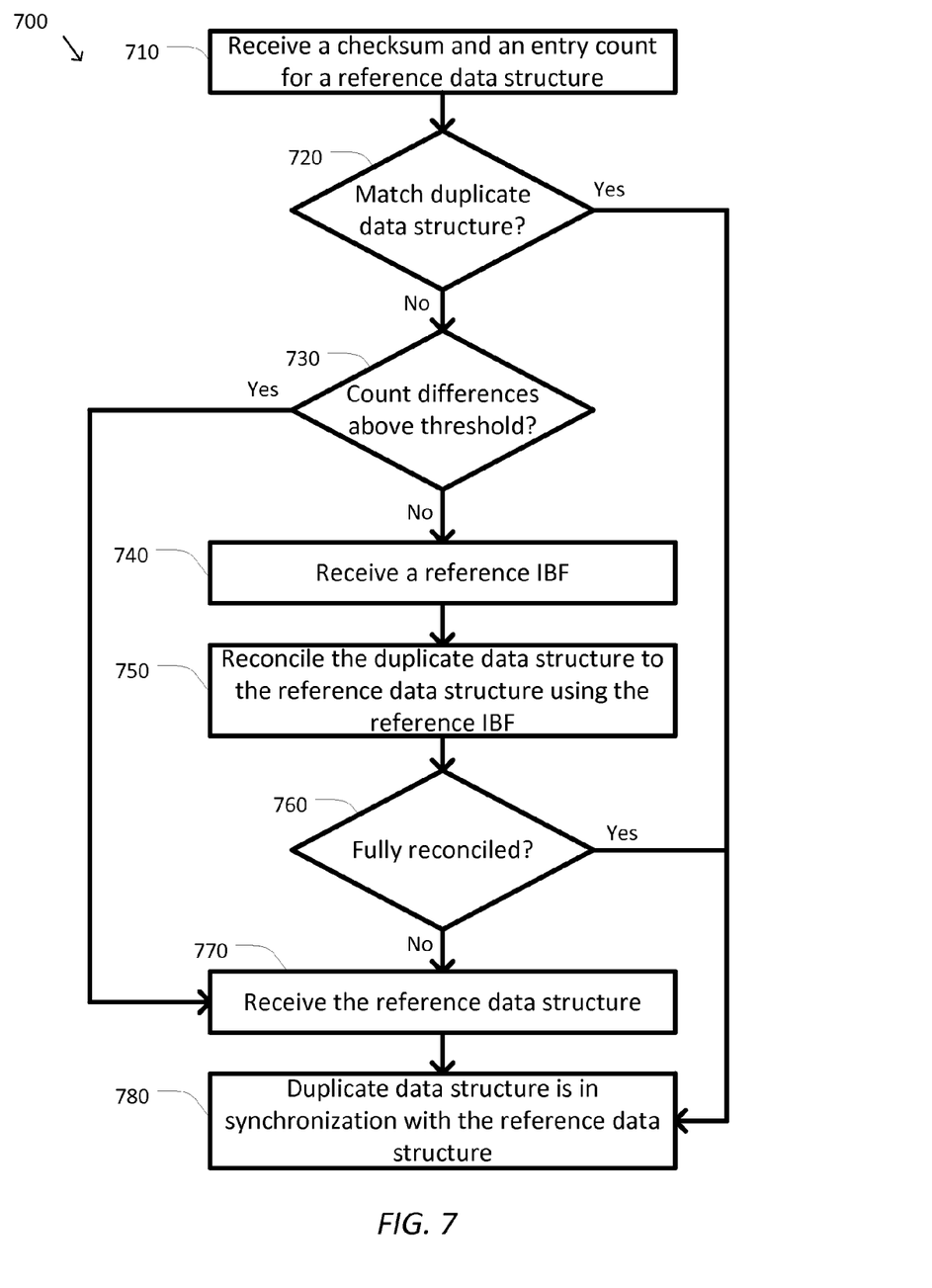
FIG. 7 is a simplified diagram of a method of synchronizing a duplicate data structure to a reference data structure according to some embodiments.

FIG. 7 is a simplified diagram of a method 700 of synchronizing a duplicate data structure to a reference data structure according to some embodiments. In some embodiments, one or more of the processes 710-780 of method 700 may be implemented, at least in part, in the form of executable code stored on non-transient, tangible, machine readable media that when run by one or more processors (e.g., the one or more processors of control units 120 and/or 150) may cause the one or more processors to perform one or more of the processes 710-780. In some embodiments, method 700 may be performed in a computing device, such as computing device 110 and/or 140. In some embodiments, method 700 may be used to synchronize a duplicate data structure in one computing device to a reference data structure in another computing device. In some examples, method 700 may be used to synchronize data structures 134 and 164. In some examples, the synchronization may be used on each of the data structures on a backup computing device to ensure that the backup computing device is ready to take over for another computing device.

At a process 710, a checksum and an entry count for a reference data structure is received. As a quick check to determine whether a duplicate data structure and a reference data are in synchronization basic comparative metrics on the reference data structure are received. The checksum and entry count may be received as parameters in an API and/or member function call and/or the like when the reference data structure and the duplicate data structure are stored on the same computing device. When the reference data structure and the duplicate data structure are stored on separate computing devices, the checksum and entry count may be received at the computing device storing the duplicate data structure via a message passing protocol such as remote procedure call, web services, and/or the like. In some examples, the checksum and entry count may be received as a first part of an exchange of messages associated with a data structure synchronization operation. In some embodiments, the checksum may be computed using any suitable checksum operation based on modulo arithmetic, any suitable hash function such as a cyclic redundancy check (CRC), and/or the like.

At a process 720, it is determined whether the checksum and entry count of the reference data structure match the checksum and entry count of the duplicate data structure. The checksums and entry counts may be used as a quick check to determine whether the reference and duplicate data structures are synchronized. When the checksums of the reference and duplicate data structures are the same and the number of entries in the reference and duplicate data structures are the same, the reference and duplicate data structures may be determined to be synchronized using a process 780. When either checksums and/or the entry counts are not the same, the reference and duplicate data structures are not in synchronization and are synchronized beginning with a process 730.

At the process 730, it is determined whether the entry count differences are above a threshold. When the reference and duplicate data structures are fairly close to synchronization, as suggested by respective entry counts that are similar in value, it may be possible to synchronize the duplicate data structure with the reference data structure by using a more efficient reconciliation process based on making incremental changes to the duplicate data structure. In some embodiments, the decision to use the more efficient incremental change process may be performed by comparing the absolute difference between the entry counts of the reference and duplicate data structures and a configurable threshold. In some examples, the threshold may be set by a user and/or an administrator of the data structure synchronization system. In some examples, the threshold may be based on a fixed value such as 5, 10, 20, and so forth. In some examples, the threshold may be set based on the percentage differences between the entry counts, with the threshold being set at 1-5 or as much as 10 percent or more of the entry count for the reference data structure and/or the entry count of the duplicate data structure. In some examples, the threshold may be based on a number of buckets in an IBF used with method 700 (as discussed in further detail below with respect to processes 740-760). When the difference between the entry counts of the reference and duplicate data structures are above the threshold, the reference data structure is received using a process 770. When the difference between the entry counts of the reference and duplicate data structures are below the threshold, an attempt is made to reconcile the duplicate data structure to the reference data structure using IBFs beginning with a process 740.

At the process 740, a reference IBF is received. A reference IBF corresponding to the reference data structure is received. Similar to the checksum and entry count received during process 710, the reference IBF may be received as a parameter from a function call, via message passing over a network, and/or the like. The reference IBF is generated from the reference data structure using the same hash functions and number of buckets as the corresponding duplicate IBF generated and/or maintained based on the duplicate data structure. In some examples, the reference and duplicate IBFs may be similar to IBF 210.

In some embodiments, the reference and duplicate IBFs may be generated using any suitable number of hash functions and buckets. In some examples, the number of hash functions and buckets may be selected to balance between the ability of the IBFs to reconcile the duplicate data structure to the reference data structure versus the computational cost of the IBFs, the space used to store the IBFs, and/or the time used to transmit the IBFs between computing devices.

In some examples, the hash functions and number of buckets may be configurable and may be set by a user and/or administrator of the data structure synchronization system. In some examples, the number of buckets may be selected to be 80, 160, 240, 320, and/or any other similar number of buckets. In some examples, the number of hash functions may be two or more in number. In some examples, the hash functions may be generated from two independent base hash functions using Equation 1, where m is the number of hash functions desired . . . . In some examples, the base hash functions may be selected from the crc32, crc16, crc32-upper, crc32-lower, and/or similar hash functions.

$$\text{hash}_k = \text{base\_hash}_1 + k * \text{base\_hash}_2; k=1, 2, 3, \ldots, m \quad (1)$$

At a process 750, the duplicate data structure is reconciled to the reference data structure using the reference IBF. Using the reference IBF received during process 740, the duplicate IBF is reconciled to the reference IBF using a process similar to method 600 where the reference IBF is the first IBF and the duplicated IBF is the second IBF. The method 600 may also be used to concurrently move the duplicate data structure closer to synchronization with the reference data structure.

At a process 760, it is determined whether the duplicate IBF is fully reconciled with the reference IBF. Using process 625 to determine whether the difference IBF is zero, it may be determined whether the duplicate IBF is fully reconciled with the reference IBF. When method 600 is able to reduce the difference IBF to buckets with each of the elements being zero, process 750 was able to fully reconcile the duplicate IBF to the reference IBF and to bring the duplicate data structure in synchronization with the reference data structure. In some examples, when process 750 is able to fully reconcile the duplicate IBF with the reference IBF, the reference IBF received during process 740 may be used to replace the duplicate IBF. When the duplicate IBF is fully reconciled with the reference IBF, the reference and duplicate data structures may be determined to be synchronized using process 780. When the duplicate IBF is not fully reconciled with the reference IBF, the reference data structure is received using process 770.

At the process 770, the reference data structure is received. Similar to the checksum and entry count received during process 710 and the reference IBF received during process 740, the reference data structure may be received as a parameter from a function call, via message passing over a network, and/or the like. The received reference data structure becomes the duplicate data structure, bringing the duplicate data structure into synchronization. In some examples, the reference IBF may also be received during process 770 and used as the duplicate IBF or a new duplicate IBF may be determined from the received reference data structure.

At the process 780, the duplicate data structure is in synchronization with the reference data structure. In some embodiments, method 700 may be repeated for additional data structures to be brought into synchronization and/or repeated periodically for the same one or more data structures.

As discussed above and further emphasized here, FIG. 7 is merely an example which should not unduly limit the scope of the claims. One of ordinary skill in the art would recognize many variations, alternatives, and modifications. In some embodiments, additional message passing and/or hand shaking operations may occur during method 700. In some examples, the computing device performing method 700 may transmit status information and/or messages during the method to trigger sending of the reference IBF filter received during process 740 and/or the reference data structure received during process 770.

In some embodiments, the synchronization of method 700 may be modified to be performed in the computing device storing the reference data structure. In some examples, process 710 may be modified so that the checksum and entry count for the duplicated data structure may be received from the computing device storing the duplicate data structure. In some examples, process 740 may be modified so that the duplicate IBF may be received from the computing device storing the duplicate data structure, and process 770 may be modified so that the reference data structure is transmitted to the computing device storing the duplicate data structure. In some examples, the reconciliation of process 750 and method 600 may be modified so that rather than making changes to the reference data structure during processes 645 and/or 655, the updates to the duplicate data structure may be transmitted as add and/or remove requests to the computing device storing the duplicated data structure.

In some embodiments, in order to avoid inconsistencies during the synchronization of method 700, one or more mechanisms may be used to prevent any changes being made to the reference data structure while the synchronization is being performed.

In some embodiments, digest data structures other than the IBF may be used with process 700. As long as the other digest data structures support adding, removing, and differencing operations similar to those described in FIGS. 3-5 and support reconciliation through mechanisms similar and/or equivalent to entry isolation using pure buckets, these other digest data structures may be used with method 700.

Some embodiments of computing devices 110 and/or 140 may include non-transient, tangible, machine readable media that include executable code that when run by one or more processors (e.g., one or more processors in control units 120 and/or 150) may cause the one or more processors to perform the processes of methods 300-700 as described above. Some common forms of machine readable media that may include the processes of methods 300-700 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A computing device comprising:
a control unit; and
a memory coupled to the control unit, the memory storing a first base data structure and a first digest data structure;
wherein the control unit is configured to:
maintain the first digest data structure based on entries stored in the first base data structure;
determine whether the first base data structure is in synchronization with a second base data structure stored in a second computing device;
wherein when the first base data structure is not in synchronization with the second base data structure, the control unit is further configured to:
receive a second digest data structure based on the second base data structure from the second computing device;
determine a third digest data structure based on differences between the first digest data structure and the second digest data structure;
attempt to synchronize the first base data structure to the second base data structure based on the third digest data structure; and
when the attempt is not successful, receive the second base data structure from the second computing device and replace the first base data structure with the second base data structure.

2. The computing device of claim 1, wherein the first base data structure is selected from a group consisting of a virtual LAN table, a link aggregation group table, a layer 2 next hop table, a layer 3 routing table, a layer 3 forwarding information base, and a flow table.

3. The computing device of claim 1, wherein the computing device is a network switching device selected from a group consisting of a router, a switch, a hub, and a bridge.

4. The computing device of claim 1, wherein the first digest data structure is an invertible bloom filter.

5. The computing device of claim 1, wherein the control unit is further configured to:
receive a first checksum for the second base data structure from the second computing device; and
determine whether the first base data structure is in synchronization with the second base data structure based on whether the first checksum matches a second checksum for the first base data structure.

6. The computing device of claim 1, wherein the control unit is further configured to:
receive a first entry count for the second base data structure from the second computing device; and
attempt to synchronize the first base data structure to the second base data structure when a difference between the first entry count and a second entry count for the first base data structure is lower than a threshold.

7. The computing device of claim 6, wherein the threshold is based on one or more selected from a group consisting of a number of buckets in the first digest data structure, the first entry count, and the second entry count.

8. The computing device of claim 1, wherein to attempt to synchronize the first base data structure to the second base data structure, the control unit is further configured to:
identify a pure bucket in the third digest data structure; and
add a first entry to or remove a second entry from the first base data structure is based on the pure bucket in the third digest data structure.

9. A method of synchronizing base data structures, the method comprising:
maintaining a first digest data structure based on entries stored in a first base data structure, the first base data structure being stored in a first computing device;
receiving a second digest data structure based on a second base data structure from a second computing device;
determining a third digest data structure based on differences between the first digest data structure and the second digest data structure;
identifying a first entry in the first digest data structure that is not in the second digest data structure or a second entry in the second digest data structure that is not in the first digest data structure based on the third digest data structure; and adding the second entry to the first base data structure or removing the first entry from the first base data structure in response to identifying the first entry or second entry.

10. The method of claim 9, wherein the first digest data structure is an invertible bloom filter.

11. The method of claim 9, further comprising:
receiving a first checksum for the second base data structure from the second computing device; and
determining whether the first base data structure is in synchronization with the second base data structure based on whether the first checksum matches a second checksum for the first base data structure.

12. The method of claim 9, further comprising:
receiving a first entry count for the second base data structure from the second computing device; and
attempting to synchronize the first base data structure to the second base data structure when a difference between the first entry count and a second entry count for the first base data structure is lower than a threshold.

13. The method of claim 12, wherein the threshold is based on one or more selected from a group consisting of a number of buckets in the first digest data structure, the first entry count, and the second entry count.

14. The method of claim 9, wherein attempting to synchronize the first base data structure to the second base data structure comprises
identifying a pure bucket in the third digest data structure; and
wherein adding the second entry or removing the first entry from the first base data structure is based on the pure bucket in the third digest data structure.

15. A computing device, comprising:
a control unit; and
a memory coupled to the control unit, the memory storing a first base data structure and a first digest data structure;
wherein the control unit is configured to:
maintain the first digest data structure based on entries stored in the first base data structure;
receive a second digest data structure based on a second base data structure from a second computing device;
determine a third digest data structure based on differences between the first digest data structure and the second digest data structure;
identify a first entry in the first digest data structure that is not in the second digest data structure or a second entry in the second digest data structure that is not in the first digest data structure based on the third digest data structure;
transmit, to the second computing device, an entry add request to add the first entry to the second base data structure or an entry remove request to remove the second entry from the second base data structure; and
when the third digest data structure cannot be used to bring the second base data structure into synchronization with the first base data structure, transmit the first base data structure to the second computing device.

16. The computing device of claim 15, wherein the first digest data structure is an invertible bloom filter.

17. The computing device of claim 15, wherein the control unit is further configured to:
receive a first entry count for the second base data structure from the second computing device; and
determine the third digest data structure when a difference between the first entry count and a second entry count for the first base data structure is lower than a threshold;
wherein the threshold is based on one or more selected from a group consisting of a number of buckets in the first digest data structure, the first entry count, and the second entry count.

18. An information handling system, comprising:
a network switching device comprising:
a control unit; and
a memory coupled to the control unit, the memory storing a first base data structure and a first digest data structure;
wherein the control unit is configured to:
maintain the first digest data structure based on entries stored in the first base data structure;
receive a second digest data structure based on a second base data structure from a second network switching device;
determine a third digest data structure based on differences between the first digest data structure and the second digest data structure;
identify a first entry in the first digest data structure that is not in the second digest data structure or a second entry in the second digest data structure that is not in the first digest data structure based on the third digest data structure;
identify a pure bucket in the third digest data structure; and
add the second entry to the first base data structure or remove the first entry from the first base data structure in response to identifying the first entry or second entry.

19. The information handling system of claim 18, wherein the first base data structure is selected from a group consisting of a virtual LAN table, a link aggregation group table, a layer 2 next hop table, a layer 3 routing table, a layer 3 forwarding information base, and a flow table.

20. The information handling system of claim 18, wherein the control unit is further configured to:
receive a first entry count for the second base data structure from the second network switching device; and
determine the third digest data structure when a difference between the first entry count and a second entry count for the first base data structure is lower than a threshold;
wherein the threshold is based on one or more selected from a group consisting of a number of buckets in the first digest data structure, the first entry count, and the second entry count.

* * * * *